United States Patent

Luu

[11] Patent Number: 5,564,146
[45] Date of Patent: Oct. 15, 1996

[54] MULTIPURPOSE UTENSIL

[76] Inventor: Tom Tho Truong Luu, 232 Beegum Way, San Jose, Calif. 95123

[21] Appl. No.: 499,823

[22] Filed: Jul. 10, 1995

[51] Int. Cl.$^6$ ............................................. B25F 1/00
[52] U.S. Cl. .............................. 7/170; 7/110; 30/122; 30/325; 294/99.2
[58] Field of Search ................ 7/110, 170; 30/122, 30/325; 294/99.2

[56] References Cited

U.S. PATENT DOCUMENTS

| | | | |
|---|---|---|---|
| 3,186,749 | 6/1965 | Dawes | 294/99.2 |
| 4,275,644 | 6/1981 | Barna | 294/99.2 X |
| 4,768,288 | 9/1988 | Culbertson | 294/99.2 X |
| 5,054,835 | 10/1991 | Loechel et al. | 294/99.2 |

*Primary Examiner*—James G. Smith
*Attorney, Agent, or Firm*—Michael I. Kroll

[57] ABSTRACT

A multipurpose utensil which comprises a tubular casing and a pair of spoons. Each spoon includes a small, shallow bowl having a rim thereabout which is on an end of a handle. The spoons are positioned with the rims face to face, allowing the handles to be inserted together into a first end of the tubular casing, with the bowls together forming an enclosed compartment.

9 Claims, 3 Drawing Sheets

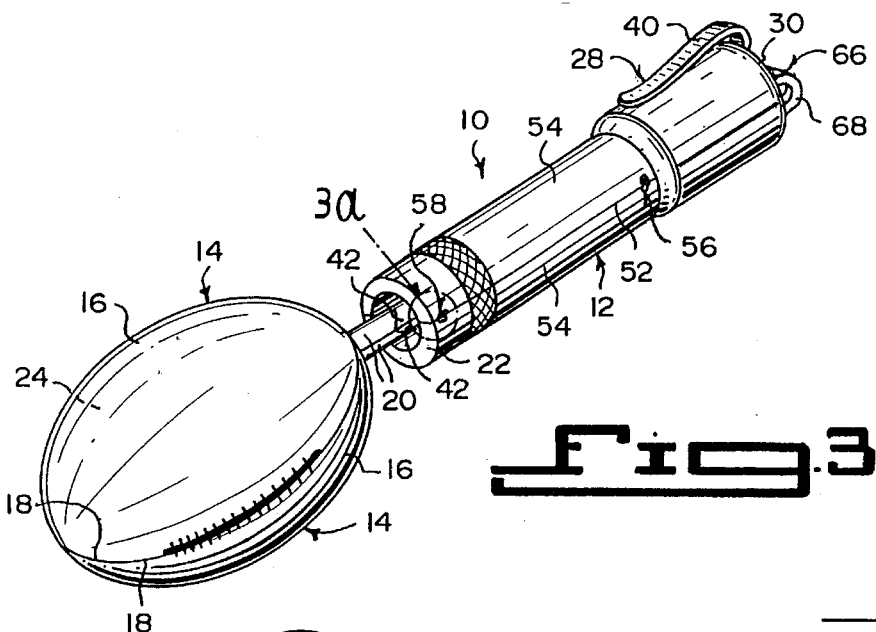
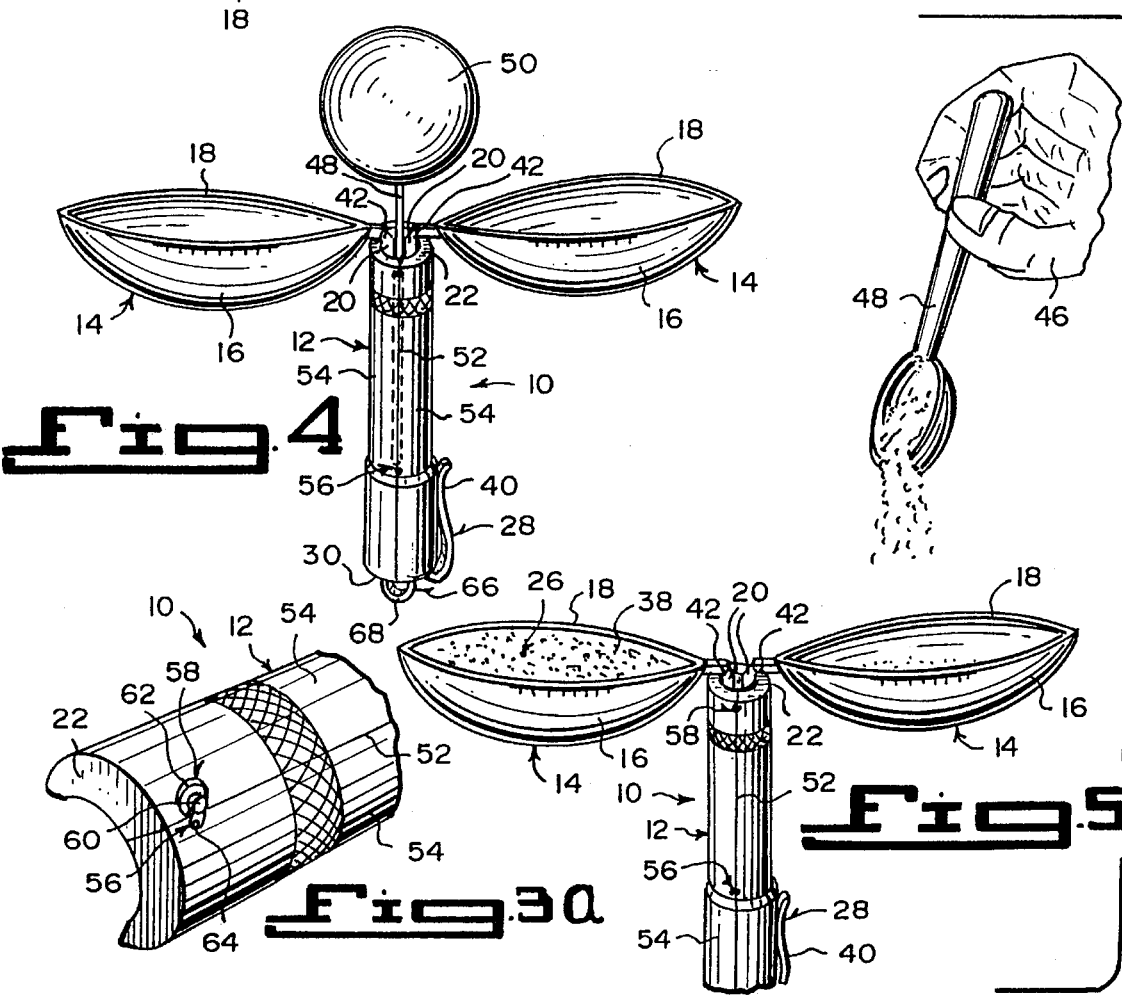

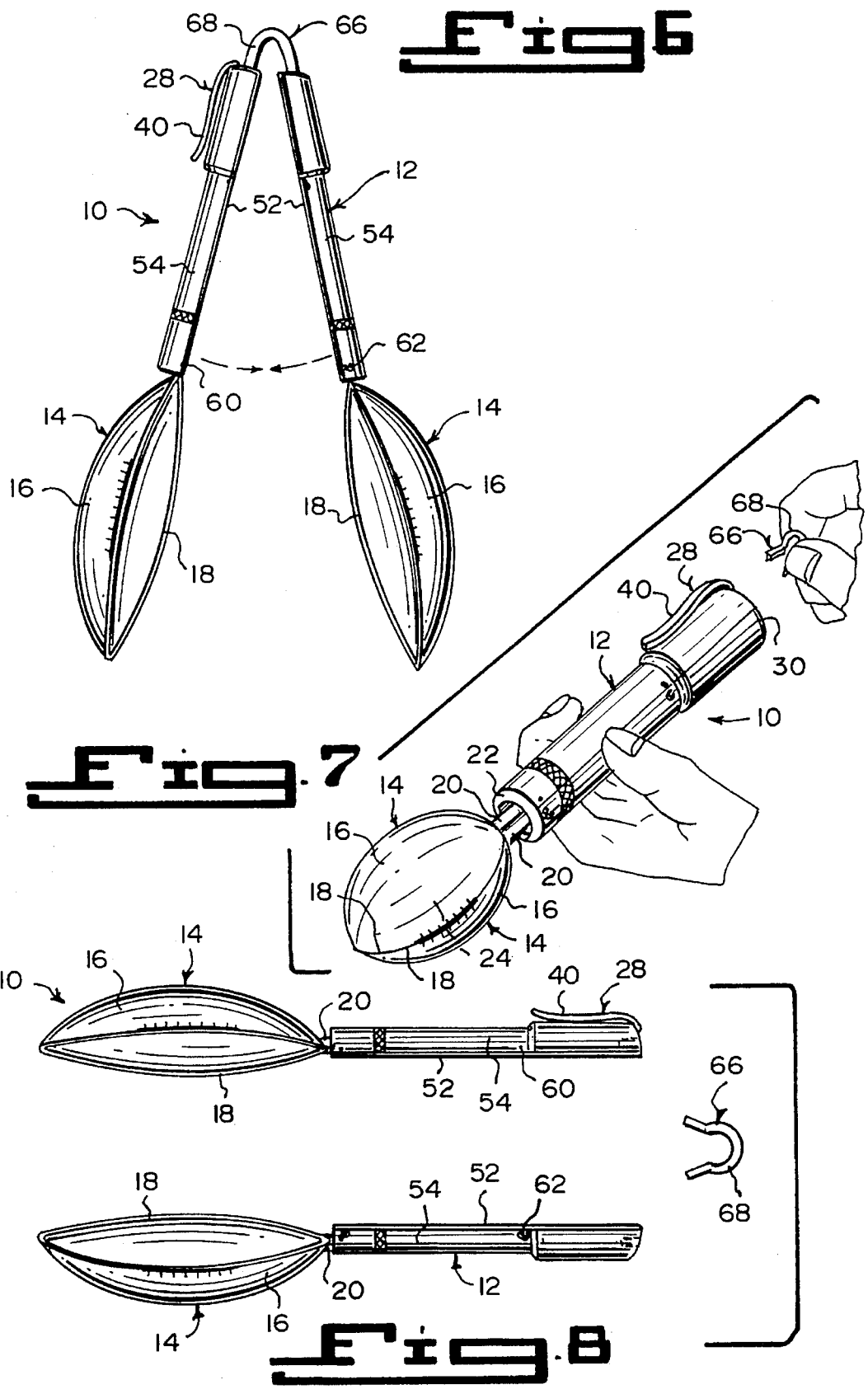

MULTIPURPOSE UTENSIL

BACKGROUND OF THE INVENTION

1. Field of the Invention

The instant invention relates generally to functional implements and more specifically it relates to a multipurpose utensil.

2. Description of the Prior Art

Numerous functional implements have been provided in prior art that are adapted to be used for special purposes by performing manual or mechanical operations, so as to accomplish the tasks the implements are designed for. While these units may be suitable for the particular purpose to which they address, they would not be as suitable for the purposes of the present invention as heretofore described.

SUMMARY OF THE INVENTION

A primary object of the present invention is to provide a multipurpose utensil that will overcome the shortcomings of the prior art devices.

Another object is to provide a multipurpose utensil that can be clipped onto a corner of a beach towel, when weighted, so that the beach towel will be retained in place.

An additional object is to provide a multipurpose utensil that can be converted into a lollipop holder, tongs or two spoons, thereby becoming a useful tool.

A further object is to provide a multipurpose utensil that is simple and easy to use.

A still further object is to provide a multipurpose utensil that is economical in cost to manufacture.

Further objects of the invention will appear as the description proceeds.

To the accomplishment of the above and related objects, this invention may be embodied in the form illustrated in the accompanying drawings, attention being called to the fact, however, that the drawings are illustrative only, and that changes may be made in the specific construction illustrated and described within the scope of the appended claims.

BRIEF DESCRIPTION OF THE DRAWING FIGURES

Various other objects, features and attendant advantages of the present invention will become more fully appreciated as the same becomes better understood when considered in conjunction with the accompanying drawings, in which like reference characters designate the same or similar parts throughout the several views, and wherein;

FIG. 3 is an enlarged perspective view of the instant invention as indicated by arrow 3 in FIG. 2.

FIG. 3a is a further enlarged perspective view as indicated by arrow 3a in FIG. 3, showing one of the latches in greater detail.

FIG. 4 is a perspective view showing the instant invention being used as a lollipop holder.

FIG. 5 is a perspective view with parts broken away, showing sand being placed into the bowls to be used as a weight.

FIG. 6 is a perspective view showing the latches opened, so that the instant invention can be used as tongs.

FIG. 7 is a perspective view showing the spring being removed and the latches opened.

FIG. 8 is a side view showing the spring removed, the latches opened and the two half segments of the tubular casing separated, so that the instant invention can be used as two spoons.

Similar reference characters denote corresponding features consistently throughout the attached drawings.

DETAILED DESCRIPTION OF THE PREFERRED EMBODIMENTS

Figure 1:
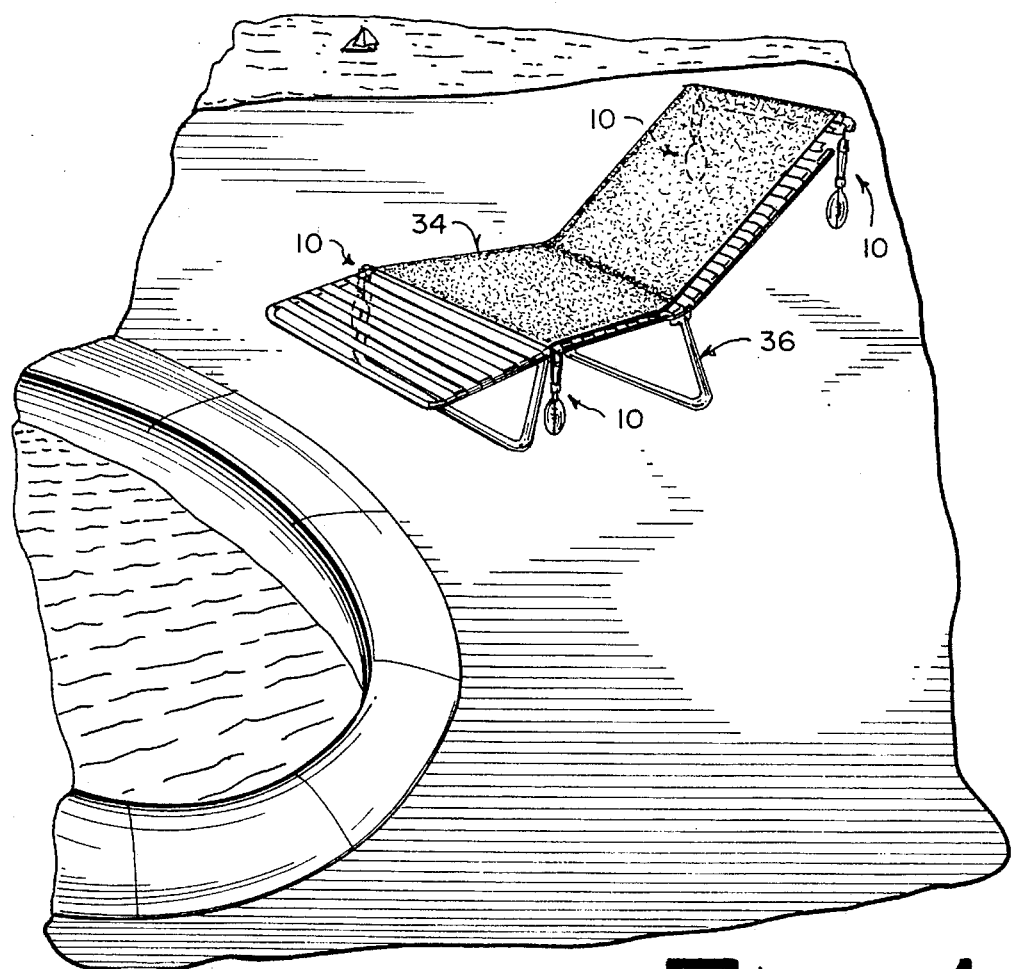
FIG. 1 is a perspective view of a beach chair with the instant invention attached to each corner of a beach towel to be used as a weight to hold the beach towel in place on the beach chair.

Turning now descriptively to the drawings, in which similar reference characters denote similar elements throughout the several views, FIGS. 1 through 8 illustrate a multipurpose utensil 10, which comprises a tubular casing 12 and a pair of spoons 14. Each spoon includes a small, shallow bowl 16 having a rim 18 thereabout, which is on an end of a handle 20. The spoons 14 are positioned with the rims 18 face to face, allowing the handles 20 to be inserted together into a first end 22 of the tubular casing 12, with the bowls 16 together forming an enclosed compartment 24, as best seen in FIGS. 3 and 7.

Figure 2:
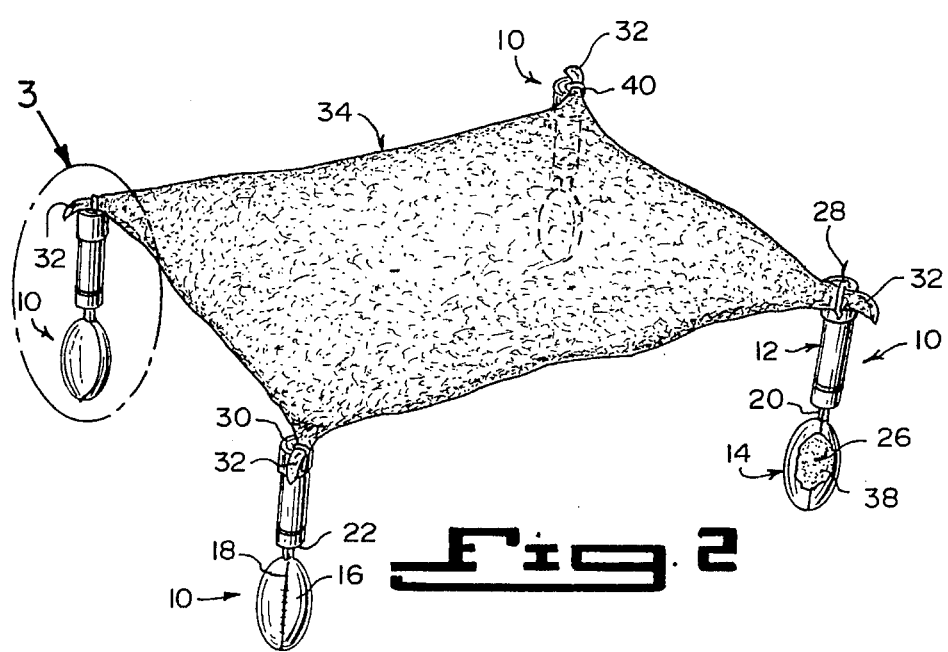
FIG. 2 is a perspective view of just the beach towel with the instant invention being four in number as weights attached by clips to the corners thereof.

A weighted material 26, as shown in FIGS. 2 and 5, can be placed into the enclosed compartment 24 of the bowls 16. A component 28 is for attaching a second end 30 of the tubular casing 12 in a releasable manner to one corner 32 of a beach towel 34. When four of the tubular casings 12 are attached to four corners 32 of the beach towel 34, the beach towel will be held in place wherever it is placed, by the weighted material 26. The beach towel 34, as shown in FIG. 1, is placed upon a beach chair 36.

The weighted material 26 is sand 38. The attaching component 28 is a clip 40 affixed to the second end 30 of the tubular casing 12 opposite from the bowls 16 of the spoons 14.

Each spoon 14 includes a hinge 42 located between the end of the handle 20 and the bowl 16. When the handles 20 are lifted slightly out from the first end 22 of the tubular casing 12, the bowls 16 can be pivoted apart. In a first instance, as shown in FIG. 5, the weighted material 26 can be deposited into the bowls 16 from a regular spoon 44 held in a hand 46 and the bowls 16 pivoted back together, as in FIG. 3. In a second instance, as shown in FIG. 4, a stem 48 of a lollipop 50 can be inserted between the handles 20 and into the first end 22 of the tubular casing 12, so that it will now function as a holder for the lollipop 50.

The tubular casing 12 has a longitudinal split edge 52, thereby forming two half segments 54. A facility 56 is for retaining the two half segments 54 of the tubular casing 12 together.

The retaining facility 56 consists of a plurality of latches 58 along the longitudinal split edge 52 of the two half segments 54 of the tubular casing 12. In a first instance, when the latches 58 are in engagement the two half segments 54 of the tubular casing 12 will be held together as one unit, as best seen in FIG. 3. In a second instance, when the latches 58 are disengaged the two half segments 54 of the tubular casing 12 will be separated to allow the spoons 14 to be used individually, as shown in FIG. 8.

Each latch 58, as best seen in FIG. 3a, includes a post 60 mounted on one half segment 54 of the tubular casing 12 adjacent the longitudinal split edge 52. A hook 62 is pivotally connected at 64 to the other half segment 54 of the tubular casing 12 adjacent the longitudinal split edge 52. The hook 62 can be manually maneuvered to engage with and disengage with the post 60.

A fulcrum 66 is located at the second end 30 of the tubular casing 12. When the latches 58 are disengaged, the half segments 54 of the tubular casing 12 will now cause the utensil 10 to function as tongs, as in FIG. 6. The fulcrum 66 is a generally C-shaped spring 68 that fits into the second end 30 of the tubular casing 12 in a removable manner, as shown in FIGS. 7 and 8.

OPERATION OF THE INVENTION

To use the multipurpose utensil 10 as a weight, as in FIGS. 1 and 2, the following steps should be taken:

1. Lift the handles 20 slightly out from the first end 22 of the tubular casing 12.
2. Pivot the bowls 16 apart on the hinges 42.
3. Place the weighted material 26 which is sand 38 into the bowls 16 (see FIG. 5).
4. Rotate the bowls 16 back together on the hinges 42, so that the enclosed compartment 24 will hold the sand 38 therein.
5. Attach the clip 40 to one corner 32 of the beach towel 34.
6. Repeat steps 1 through 5 three more times.

To use the multipurpose utensil 10 as a lollipop holder, as in FIG. 4, the following steps should be taken:

1. Do steps 1 and 2 as described above.
2. Insert the stem 48 of the lollipop 50 between the handles 20 and into the first end of the tubular casing.

To use the multipurpose utensil 10 as a tong, as shown in FIG. 6, the following steps should be taken:

1. Insert the generally C-shaped spring 68 into the second end 30 of the tubular casing 12.
2. Disengage the hooks 62 from the posts 60 on all the latches 58.
3. Squeeze the half segments 54 of the tubular casing 12 together, so that the bowls 16 can grasp various articles.

To use the multipurpose utensil 10 as spoons, as shown in FIG. 8, the following steps should be taken:

1. Remove the generally C-shaped spring 68 from the second end 30 of the tubular casing 12.
2. Disengage the hooks 62 from the posts 60 on all of the latches 58.
3. Separate the half segments 54 of the tubular casing 12, so that the spoons 14 can be used in a regular way.

LIST OF REFERENCE NUMBERS 10 multipurpose utensil
12 tubular casing of 10
14 spoon of 10
16 bowl of 14
18 rim on 16
20 handle of 14
22 first end of 12
24 enclosed compartment
26 weighted material
28 attaching component
30 second end of 12
32 corner of 34
34 beach towel
36 beach chair
38 sand for 26
40 clip for 28
42 hinge on 20
44 regular spoon
46 hand
48 stem of 50
50 lollipop
52 longitudinal split edge in 12
54 half segment of 12
56 retaining facility
58 latch of 56
60 post of 58
62 hook of 58
64 pivot of 62
66 fulcrum
68 generally C-shaped spring for 66

It will be understood that each of the elements described above, or two or more together may also find a useful application in other types of methods differing from the type described above.

While certain novel features of this invention have been shown and described are pointed out in the annexed claims, it is not intended to be limited to the details above, since it will be understood that various omissions, modifications, substitutions and changes in the forms and details of the device illustrated and in its operation can be made by those skilled in the art without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed is new and desired to be protected by Letters Patent is set forth in the appended claims:

1. A multipurpose utensil which comprises:
   a) a tubular casing;
   b) a pair of spoons, in which each said spoon includes a small, shallow bowl having a rim thereabout on an end of a handle, whereby said spoons are positioned with said rims face to face, allowing said handles to be inserted together into a first end of said tubular casing, with said bowls together forming an enclosed compartment;
   c) a weighted material placed into said enclosed compartment of said bowls; and
   d) means for attaching a second end of said tubular casing in a releasable manner to one corner of a beach towel, so that when four said tubular casings are attached to four corners of the beach towel, the beach towel will be held in place wherever it is placed, by the weighted material.

2. A multipurpose utensil as recited in claim 1, wherein said weighted material is sand.

3. A multipurpose utensil as recited in claim 2, wherein said attaching means is a clip affixed to said second end of said tubular casing opposite from said bowls of said spoons.

4. A multipurpose utensil as recited in claim 1, wherein each said spoon includes a hinge located between the end of said handle and said bowl, so that when said handles are lifted slightly out from said first end of said tubular casing, said bowls can be pivoted apart allowing in a first instance said weighted material to be deposited into said bowls and said bowls pivoted back together and allowing in a second instance a stem of a lollipop to be inserted between said handles and into said first end of said tubular casing, so that it will now function as a holder for the lollipop.

5. A multipurpose utensil as recited in claim 1, further including:

a) said tubular casing having a longitudinal split edge, thereby forming two half segments; and b) means for retaining said two half segments of said tubular casing together.

6. A multipurpose utensil as recited in claim 5, wherein said retaining means includes a plurality of latches along said longitudinal split edge of said two half segments of said tubular casing, so that in a first instance when said latches are in engagement said two half segments of said tubular casing will be held together as one unit, and in a second instance when said latches are disengaged said two half segments of said tubular casing will be separated to allow said spoons to be used individually.

7. A multipurpose utensil as recited in claim 6, wherein each said latch includes:

a) a post mounted on one said half segment of said tubular casing adjacent said longitudinal split edge; and b) a hook pivotally connected to other said half segment of said tubular casing adjacent said longitudinal split edge, so that said hook can be manually maneuvered to engage with and disengage with said post.

8. A multipurpose utensil as recited in claim 6, further including a fulcrum located at said second end of said tubular casing, so that when said latches are disengaged said half segments of said tubular casing will now cause said utensil to function as tongs.

9. A multipurpose utensil as recited in claim 8, wherein said fulcrum is a generally C-shaped spring that fits into said second end of said tubular casing in a removable manner.

\* \* \* \* \*